United States Patent [19]

Hinderks

[11] 4,024,933
[45] May 24, 1977

[54] BRAKE AND VEHICLE BRAKING SYSTEM

[76] Inventor: Mitja Victor Hinderks, 15a Adamson Road, London, England, NW3

[22] Filed: Oct. 25, 1974

[21] Appl. No.: 518,075

[52] U.S. Cl. .............................. 188/77 R; 188/259
[51] Int. Cl.² ................... F16D 49/12; F16D 65/06
[58] Field of Search .............. 188/77 R, 77 W, 242, 188/259, ; 192/107 M, 107 T

[56] References Cited

UNITED STATES PATENTS

| 1,565,240 | 12/1925 | Anderson | 188/259 |
| 1,572,601 | 2/1926 | Gray | 188/259 |
| 1,764,176 | 6/1930 | Loughead | 188/77 R |
| 1,812,036 | 6/1931 | Christensen | 188/77 R X |
| 1,840,337 | 1/1932 | Traupmann | 188/77 R X |
| 1,926,064 | 9/1933 | Sawtelle | 188/259 |
| 2,272,003 | 2/1942 | Holland | 188/259 X |
| 2,291,525 | 7/1942 | Bessey | 188/242 |
| 2,414,677 | 1/1947 | Tremolada | 188/77 R |
| 3,516,519 | 6/1970 | Besoyan | 188/259 X |

Primary Examiner—Duane A. Reger
Attorney, Agent, or Firm—Wigman & Cohen

[57] ABSTRACT

The invention relates to an improved type of band brake, suitable for fitment to vehicle wheels, wherein the ends or fixings of the band intermesh and project past each other to be attached to anchorage points, movable or otherwise. Alternative systems and linkages of band brake application are disclosed, as well as improved configurations of band assembly, intermeshing band ends, and tensile load carriers or cores. Ways are disclosed for more accurately controlling and distributing the loads set up within a band brake on application.

15 Claims, 29 Drawing Figures

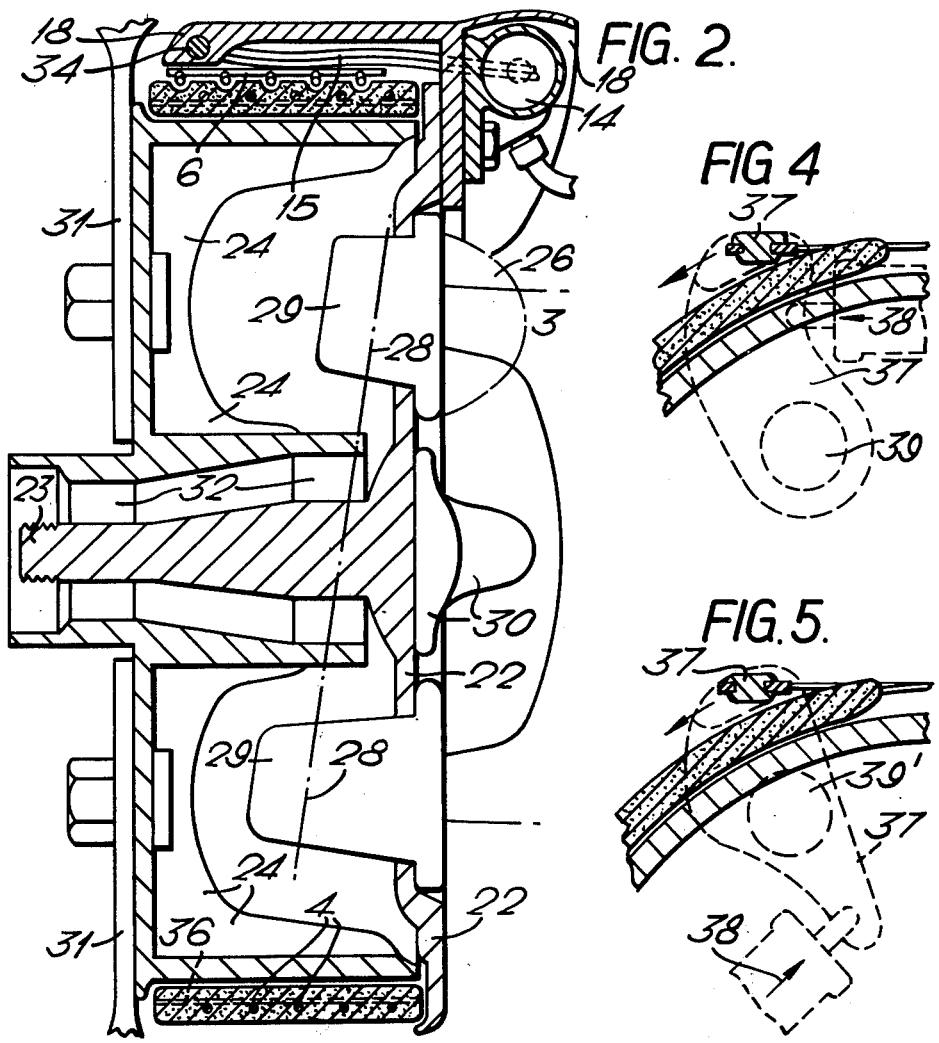
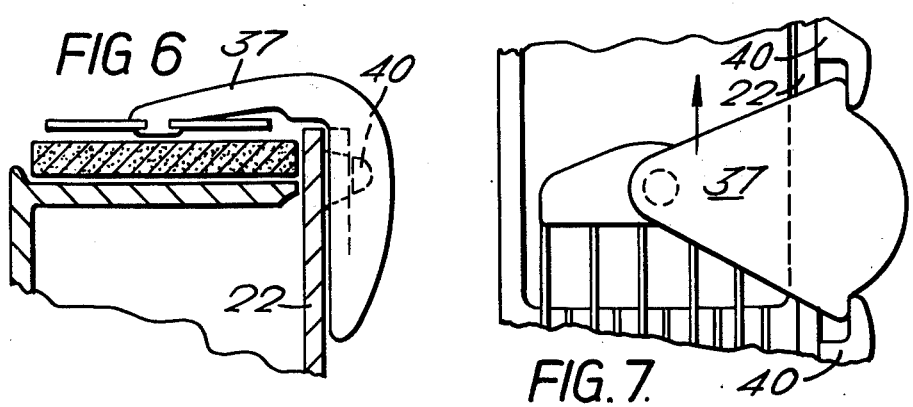

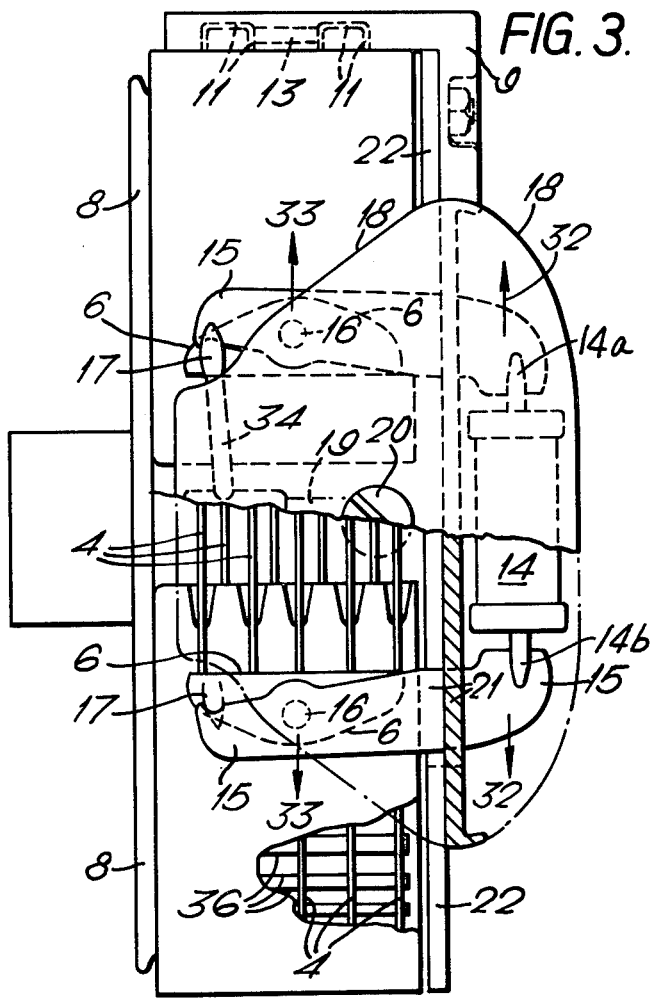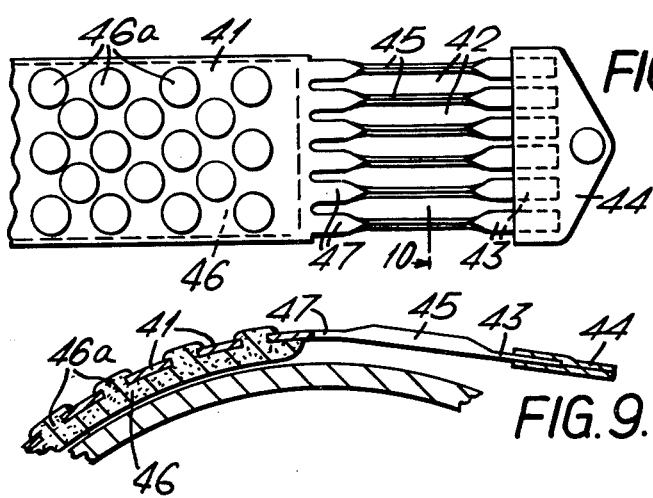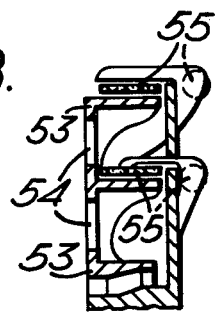

BRAKE AND VEHICLE BRAKING SYSTEM

CROSS-REFERENCE TO RELATED APPLICATION

This application is a continuation-in-part of my copending U.S. patent application, Ser. No. 353,735, filed Apr. 23, 1973.

BACKGROUND OF THE INVENTION

The invention concerns an improved wheel or drum brake, especially suited for fitment to vehicles of all kinds, as well as a vehicle brake system which allows some of the energy used in braking, which is normally dissipated by heat dispersal, to be salvaged and used to power either the brake system itself, or ancillary systems, or used to provide energy for important primary and secondary features.

BACKGROUND TO THE INVENTION

As may be gathered from the title, the brake itself is most suited to be fitted to the wheels of road and rail vehicles, or to the undercarriages of aircraft. The benefits of the brake would accrue in its fitment to any road vehicle, but are especially great in the case of vehicles having high axle loads and operating with long service intervals or under dirty conditions, such vehicles including trucks, coaches, cross-country transport, quarrying and earth-moving equipment, loaders, etc. It is also especially suited for fitment as a front wheel brake for large capacity motor cycles or "superbikes", for reasons explained later. The brake may also be embodied in industrial applications such as transmission brakes, cable or winch brakes, and in any fail-safe application, such as may be used in elevators, ski-lifts, mining gear, etc. Concerning the brake system, this may be conveniently adapted to any vehicle, with the possible exception of large aircraft, but is most suited to incorporation in road commercial vehicles, such as large trucks, and in passenger cars.

The present invention is very much affected indirectly by legislation, either already in force or projected in such developed countries as the U.S.A., Japan, Germany and Scandinavia. The laws relate to the strict imposition of very demanding specifications for vehicle stopping distances and skid control, especially in the case of commercial vehicles. Further heavy trucks will be required to stop in a straight line under all weather conditions in distances being achieved by present passenger cars. Because commercial vehicle axle loads have been progressively increased — they are now in the region of ten to fourteen tons — and wheel sizes reduced to accommodate bulkier pay loads, these new stopping distances are barely achievable using existing concepts. The drum and shoe arrangement is at the limit of its development and in these new applications becomes so highly stressed that it becomes unreliable and short-lived, in performance at least. Similar considerations apply to disc brakes where used in trucks, where performance may be slightly better at the cost of even shorter life. Disc brakes have a heat problem (up to seven tons per brake unit may need to be stopped and equivalent energy dissipated, compared with one-fourth to one-half a ton for cars), because in commercial vehicles they cannot be placed in the air stream without unacceptably low life and high maintenance cost. For these reasons it is the conviction of the inventor that only different brake types will in the long term meet commercial vehicle needs. It can be seen that the band brake with its inherent higher performance and consequently lower stressed hydraulic system, its far greater surface area and better load distribution, with consequent better longevity, its lower weight compared to drum and shoe arrangements and, not least, its ability to allow wheel and steering centres to coincide, offers the commercial vehicle manufacturer an answer to braking problems. (The technical considerations mentioned above will be more fully described in later sections.) In practice the band brake would be fitted in association with a modern hydraulic system. For normal car use servo assistance could be eliminated, since the brake is more powerful for a given pedal pressure, improving brake control and "feel". In other applications servo assistance may be introduced either to improve braking effect, or perhaps to reduce it under special conditions, e.g. to prevent low speed lock up.

Before explaining the operational aspects of the invention, it might be appropriate to mention the traditional roles of band brakes. They are today used mainly as transmission, winch and pulley brakes, as well as for fail-safe applications. At one period about the 1920's band brakes were fairly extensively tried as vehicle wheel brakes, but their large scale introduction did not materialise for a number of reasons. These included the fact that they were mostly U-shaped and so transferred hard unequal loads onto the axle during braking, or, if nearly circular, application was by L-shaped projections at the ends of the band, which meant that brake application caused great torsional loads at the ends of the band, resulting in excessive wear at that point and uneven load distribution throughout the band. Band brakes are much sharper and more powerful than drum brakes for equivalent pedal pressures, with the result that braking performance inequalities, often due to the inferior friction materials then used, tended to be magnified. In any case, what were for that period perfectly acceptable stopping distances could be achieved using drum brakes, which were then much larger than today because of the much larger wheel sizes then prevalent, thus, eliminating the motive for extended development of the band brake.

It can be seen from the above comments and the later full description of the invention that the present invention overcomes the major objection to the use of the band brake, which is its previous method of application. With the present brake it is possible to eliminate completely the U configuration and achieve a band brake of almost circular form, and to apply the brake without any torsional forces being set up in the band. Because the tensile forces pass through each other, it is possible to locate the actuating means so far away from the band as to allow for the variation and adjustment of force application points during the progressive tightening of the band, matching the movement to the decreasing circumference and radius of the band. In fact this brake could be called a tensile reducing radius brake, since the band is effectively a circle which shrinks when force is applied. A problem with band brakes on vehicle wheels is that when not applied rapid suspension movement might cause the band to flap or chafe against the revolving drum. This problem is here overcome by the guides used (of which more than two could be employed). To some degree, dependent on whether one or both ends are floating, a band brake will tend to have an on-off servo effect, with the drum tending to pull the band onto it towards one end and push it off at the other. This characteristic feature is no obstacle to the employment of band brakes, which are used very successfully in many applications. This pulling with/pushing against effect, which really describes the forces set up in a circle tending to rotate but which is fixed at one point, can be modified and controlled by design and application of special features of the invention, so that the load distribution can be precisely controlled and/or equally distributed throughout the band. This, which will result in even wear and even radial loads at all points of the circumference, would constitute a significant breakthrough in brake technology and that of band brakes in particular, and is more fully described in the following sections.

Band brakes have significant advantages over other types of brakes, such as the drum and shoe and the disc type in current automotive use. For a given available space and pedal or application force, they produce a many times more powerful braking effect. The band is flexible, allowing for far more even load distribution, and the loads are applied perpendicularly, unlike in drum and shoe arrangements, where at only one point in the rigid arcuate shoe are the loads perpendicular. The very much greater friction material surface area results in longer brake life, as of course does the more even load distribution. Another basic advantage of the band brake is that the interior of the drum is free. This is very important because it means that the drum interior can be occupied by wheel steering pivots such as king pins, allowing wheel centre and steering pivot centre to be as coincidental as the vehicle designer wishes. The handling and safety advantages in having the steering centre as close to wheel centre as possible are well known, and their coincidence is only possible, in the case of wheel mounted brakes, if a band brake is used. If the drum interior does not contain sensitive brake mechanism, then cooling air from the air stream past the vehicle can be ducted through the drum, as indicated in the drawings. The drum may also have interior flanges or fins to act as cooling means, stiffeners or both. The friction material is exposed, so the backs of both the major brake elements may be cooled. Both the two actual braking surfaces are outside the mechanicals of the wheel and communicate with the air stream, so that when the brake is inoperative a controlled air flow may be passed through the gap between braking surfaces.

It has been mentioned that the brake is suitable for various types of vehicles, and also for other applications. It is especially suitable for powerful motorcycles, for the reason that the interior of the drum may be free, i.e. that the drum may consist of a stub cylinder interiorly supported by spokes or flanges, and so admit air transversely through it. At high speed a motorcycle's safety and road adhesion can be seriously affected by side winds which affect particularly the front wheel. Current powerful cycles must employ large disc brakes which do not leave much room for air to pass between the spokes; obviously a band brake can be designed to leave nearly all the wheel unobstructed to lateral air movement, allowing the motorcycle to have improved road adhesion.

The world fuel crises of late 1973, triggered off by the Middle East war of October that year, have caused a complete shift of attitude to engine and vehicle fuel economy to take place in all countries of the world. In the developed countries every possible technical innovation that might lead to fuel saving is being explored, and in the non-oil-producing countries great efforts are being made to reduce oil imports, now up to four times as expensive as 15 months ago. Here efforts are being directed to restricting vehicle use (for example by imposing speed limits), because fuel saving innovations have not have incorporated on vehicles on the road. So throughout the world there is a great demand for any device which may reduce automotive fuel consumption, either incorporated during manufacture of the vehicle, or fitted afterwards to existing units.

In general vehicle use, by far the greatest proportion of fuel use per distance travelled is spent in accelerating the vehicle, and propelling it up inclines. All the energy expended on these activities is dissipated by braking (the vehicle cannot proceed indefinitely), in the form of conversion of movement through friction into heat which is then lost, or in pumping inoperative fluid through the engine. If any of the energy required to stop or retard the vehicle can be recovered and/or converted into useful work in any manner, then a net fuel saving will have been achieved. The vehicle braking system of the present invention is designed to achieve this, as will be disclosed in later sections, and in some embodiments to convert the energy expended in braking to work propelling the vehicle.

It has been mentioned earlier that much new legislation relating to vehicle stopping distances has been passed, or is contemplated in developed countries. In fact this is a part of a whole spectrum of vehicle safety legislation now being enacted. There is increasing awareness of the unnecessary social, personal and economic disruption and waste caused by automotive accidents, and the legislation is intended to try to reduce accidents to the minimum practical level. There is a demand today, both from the public and sometimes legally from a government, for devices which improve either primary or secondary vehicle safety. The vehicle braking system of the present invention is designed to convert some of the work of, or constructional requirements inherent in, braking to effect improved primary and secondary vehicle safety.

SUMMARY AND OBJECTS OF THE INVENTION

The brake of the invention is a departure from the current drum/shoe and disc types in vehicle use, and because it is different is able to meet the following objectives: (a) It provides a many times stronger braking effect for a given application pressure, and deployment in a given space, than rival types. (b) The brake is such as to ensure that the friction material always rests on the braking surface with evenly distributed and perpendicular loads, unlike the rigid friction material platforms of current design when part worn or imperfectly fitted, and unlike drum and shoe practice where the loads are only perpendicular at one point towards the middle of the shoe and tangential elsewhere. (c) Because of the brake's inherent design and because it meets the objective above, it will be considerably longer lasting than alternative systems. (d) It is possible to expose the friction material, the braking platform and the gap between the two when the brake is not applied all to a controlled air stream. With development and good detail design this could lead to superior heat dissipation in many applications. (e) The brake is of a design such that it might be applied to a wheel in such a way that the brake centre, taken along its moment of rotation, and the wheel centre, as well as any steering or king-pin centre may all be coincidental, this being a feature unique to my type of brake. (f) It is possible to manufacture the brake in double or triple form on one wheel, this enabling a designer to use both brakes of a double unit hydraulically on front wheels, with one brake hydraulic and one parking on a double rear wheel unit. The two brakes of the common double rear wheel unit may have differing performance. This advantage allows for more realistic brake distribution between front and rear wheels. (g) The brake of the present invention allows for improved friction material compositions and constructions to be used, giving superior rates of heat dissipation. The more particular objects of the vehicle braking system are as follows: (h) to convert energy expended in braking to electrical energy; (i) to store or accumulate energy expended in braking, for possible use during other driving modes; (j) to use energy expended in braking to actuate at least a portion of the braking system; (k) to use energy expended in braking to compress a working fluid; (l) to use energy expended in braking to drive, during a different mode of operation, an engine or vehicle; (m) to use energy expended during braking to afford during that period improved vehicle and pedestrian impact protection; (n) to use energy expended during braking to increase vehicle structural strength; (o) to use as components for this brake system items already present in the vehicle so doubling on function and effecting material and resources savings; (p) to use the brake system to provide improved vehicle security; (q) to provide a means of ensured overlasting or panic application of brake actuation means, thus reducing risk of accident due to operator error; (r) to use energy expended during braking to assist in an improved exhaust gas flow.

The invention consists of a band brake comprising a band assembly manufactured at least partly of friction material and of nearly circular form surrounding a drum capable of rotation, the end parts of said band overlapping and intermeshing past each other to be connected to a portion of actuation means, said portions being movable away from each other and in such operation causing the band to contract onto the drum, said end parts of the band assembly consisting in two or more intermeshing members.

The invention further consists of the band assembly portion of a brake having protrusions from its external circumference movably communicating with guide members.

The invention further consists of two or more brake assemblies concentrically mounted substantially in the same radial plane about an axle. The invention further consists in an engine, connected to a drive mechanism, said engine having slidably mounted in association with it a mechanism capable of causing work to be produced, hereinafter called an ancillary engine, said ancillary engine being capable of coupling to said drive mechanism during a braking mode of the first engine operation, and being capable of being uncoupled from said drive mechanism during at least part of other modes of the first engine operation.

The invention further consists of the provision of a locking mechanism associated with a vehicle handbrake lever, said locking mechanism in operation causing the movement of any release mechanism associated with said lever to be restricted.

The invention further consists of the provision of a dampening mechanism to be connected between a movable brake application lever and a fixed anchorage point.

The invention further consists of a hollow tube circumferentially disposed about the jamb of a closure member, said tube being inflatable when said member is in closed position to expand against a frame or fixed structure.

The invention further consists of a vehicle bumper having a nose section which is inflatable during certain vehicle driving modes, including braking.

The invention further consists of a vehicle having surfaces which during braking project to cause drag and/or downward thrust.

BRIEF DESCRIPTION OF THE DRAWINGS

FIG. 2 is a vertical sectional view of the brake band assembly of FIG. 1;

FIG. 3 is a partly broken plan view of the brake band assembly of FIG. 1;

FIGS. 4–7 show in partial sectional views alternative embodiments of brake levers for actuating the band brakes of the present invention;

FIG. 8 shows a partial plan view of an alternative construction of the brake band of the present invention;

FIG. 9 is a longitudinal section of the brake band of FIG. 8;

FIG. 10 is a cross-section of the folded construction of the ribbon elements of the brake band of FIG. 8;

FIGS. 11 and 12 show alternative arrangements for connecting a friction element to a tensile load carrier;

FIG. 13 shows a partial sectional view of a plurality of band brakes arranged on a single multi-flanged brake drum;

FIG. 14 illustrates diagrammatically in cross-section a friction element having a variable composition of frictional constituents across its thickness;

DETAILED DESCRIPTION OF A PREFERRED EMBODIMENT

Figure 1:
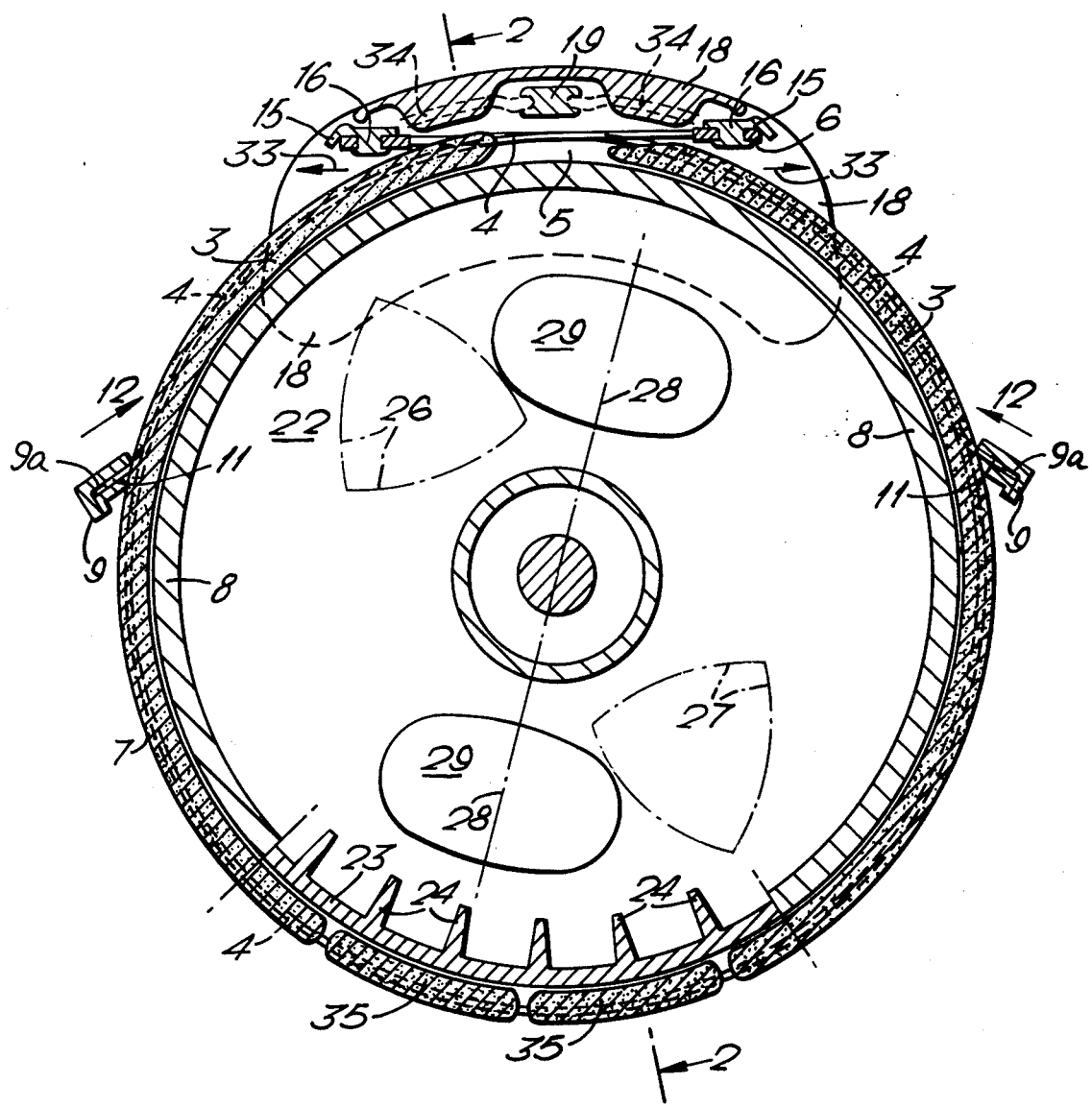
FIG. 1 is a sectional view of a band brake assembly of the present invention mounted on a front steered wheel of a road vehicle.

Referring now to the drawings, FIG. 1 illustrates a brake band assembly 7 of the present invention. The brake band assembly 7 is arranged in circumferentially spaced relation to a flange 8 of the brake drum of a vehicle wheel. The brake band assembly 7 includes a generally circular friction element 3 formed on spring steel cores 4 disposed longitudinally through the friction element 3. At the ends of friction element in the region designated 5, the cores 4 intermesh with each other in non-contacting relation and are affixed to respective band distribution plates 6 at the upper portion of the brake band assembly 7. The spring steel cores 4 apply an outward radial force to the friction element 3 to maintain the diameter thereof slightly greater than the diameter of brake drum flange 8 during periods of non-actuation of the band brake. Uniform circumferential spacing between the friction element 3 and flange 8 is controlled by guides 9 each having a slot 9a for receiving looped wire protrusions 11 extending from the band assembly 7. Because the slots 9a are aligned in the direction of closure movement caused by contraction of the band assembly 7, as shown by the arrows at 12, it is possible to regulate the desired or uniform spacing of the band assembly 7 from the flange 8 when the brake is not in operation. The guides 9 also regulate the lateral position of the band assembly 7 by the provision of stops 13 in the slots 9a.

The hydraulic cylinder piston assembly 14 is connected by plungers 14a, 14b to one end of respective brake levers 15. Expansion of the piston assembly 14 causes movement of the plungers 14a, 14b and their respective brake levers 15 in opposite directions as shown by the arrows 32. Brake levers 15 extend through slots 21 in back plate 22 and are connected intermediately thereof to a pivot 16 of a respective load distribution plate 6. The other ends of brake levers 15 bear on jaws 17 formed in the outwardly directed ends of arms 34 which extend through bores in the cast high-strength anchorage plate 18. After insertion into the bores, the arms 34 are bent to the shape shown in dotted line in FIG. 1. As best seen in FIG. 3, movement of the plungers 14a, 14b in the directions 32 will articulate brake levers 15 about jaws 17 thereby moving pivots 16 and load distribution plates 6 in opposite directions as shown by the arrows at 33, thus contracting the brake band assembly 7. The inwardly directed ends of arms 34 are affixed in wedge-shaped grooves in an adjustment arm 19 which may be adjusted in a direction parallel to the brake drum axis by an eccentric of cammed screw 20 secured in the top of anchorage plate 18.

At the lower sectioned portion of FIG. 1, there is shown an alternative arrangement of the brake band comprising discontinuous friction elements 35 mounted on a continuous band 25. Such a configuration is useful where very inflexible friction material is used, where the road conditions are very dirty or where greater air movement to the working parts is needed. Cooling of the drum interior may be provided by a ram air scoop 26 and an extract cowling 27.

FIG. 2 illustrates how it is possible to move the steering pivots 29 or king pin inclination 28 within the wheel thickness. Steering arm 30 is mounted on the integral back plate 22 and stub axle 23 which support the drum and wheel 31 through bearings 32 in a conventional manner.

FIG. 3 shows the friction element 3 broken away to expose the interior thereof which comprises longitudinal spring steel cores 4 with secondary smaller transverse load distribution wires 36. The layout of mechanism for actuating the brake described above involves the two load distributor plates 6 in operation substantially moving in a straight line at 180° to one another. Depending on the degree of movement required in the direction shown by the arrow at 33 and the position of pivot 16 relative to jaw 17, there is some possibility of the pivots 16 describing on plan (see FIG. 3) a slight curve towards the outside of the drum, thus tending to slightly shift band assembly relative to drum during brake application. In order to avoid this risk and also to allow the load distributors to describe a curve in the other plane, i.e. elevationally in FIG. 1, alternative actuating configurations as illustrated for example in FIGS. 4 to 7 may be used.

FIGS. 4 through 7 show, diagrammatically, alternative arrangements using a C-shaped cantilever brake arm 37. In FIG. 4, one hydraulic cylinder 38 per brake is used and in FIG. 5 two hydraulic cylinders 38 are used, their respective pivots 39 and 39' being arranged in different positions. For simplicity, only the one-half of the brake arrangements has been shown.

In FIGS. 6 and 7, there is shown a further embodiment of a cantilever brake arm 37 which is of extremely rigid and strong construction and which may be cast, for example, in a magnesium alloy. Torsion restrainers 40 are affixed to brake plate 22 and restrain the cantilever arm 37 in the manner illustrated. The ability of the load plate to describe a curve during closure is important, in that correct design of load path will ensure that the ends of the band at all stages during application take up the correct and desired proportion of braking loads, relative to the rest of the band.

The basic embodiment shows the friction material supported on a system of stainless steel wires, the larger of which are also the actuating means. With relatively thick or hard friction material this design is satisfactory, but with thinner or softer material there is a danger of shadowing, i.e. disproportionate loading and wear taking place immediately underneath the wire, or even worse, if the application loads are very strong, for the wires to press into and through the material to eventually seat loosely in an oval hole in the material. To obviate these dangers, alternative band assembly configurations, as illustrated by example in FIGS. 8 to 11, may be employed. FIGS. 8 and 9 show views of one end of an alternative band assembly wherein the band comprises an optionally holed sheet 41 with the end thereof cut to a ribbon configuration 47. Each flat ribbon section 47 is folded for part of its length in the manner shown at 45 in FIGS. 8 and 10 to permit a similar portion of the other end (not shown) to intermesh through the spaces 42 between the folded portions 45. The flat ribbon sections 43 extending beyond the folded portions 45 are secured between two plates of a load distribution plate 44. If the band 41 is provided with holes, the friction element 46 is secured to the band by means of bosses 46a in the manner shown in FIG. 9. Any alternative fixing or relationship of tensile sheet or band to friction material may be employed, and where the ends of the sheet continue to form intermeshing load carrying members, they may be cut, divided, bent, shaped in any convenient mode.

With band brakes, because the friction material is external of the drum, the back of the band is exposed to an air stream when the brake is applied, and when it is not applied the space between the braking surfaces communicates with the external air stream. FIGS. 1 to 3 described means of additionally cooling the back of the drum. With conventional drum and shoe brakes the friction material assembly is not cooled, and it is here that heat build-up tends to occur, rather than in the drum which much better conducts away its share of friction-induced heat. Thus it seems possible that in a majority of applications the present invention will have as good or better a rate of heat dissipation as conventional drum brakes. However, because the brake is external, it may still be desirable to have improved conductivity from the braking surfaces to the back of the band, as shown for example in the embodiments of FIGS. 11 and 12. FIG. 11 shows a heat conductor, in this case, fine copper wires 48 running from the friction surface 50 through the friction member 46 and exposed to air flow at surface 51 of boss 46a for conducting heat from the friction surface of the member 46. FIG. 12 shows the band 41 pierced in such a way that the resultant deformed metal forms both a friction member anchor and presents exposed cooling surfaces 51 and 52 to air flow. Additionally the friction material may be composed of high conductivity material, such as for example an aggregate containing substantial quantities of the more thermally conductive ceramics such as beryllium oxide, silicon carbide or silicon nitride. Present friction materials tend to contain a high proportion of asbestos, a fibrous ceramic having exceptionally poor thermal conductivity.

FIG. 13 shows diagrammatically a half cross-section through a multiple brake assembly, here consisting of two band brakes 55 arranged concentrically about a single axle to operate on a drum assembly 53, holed at 54 for interior cooling, comprising two drum-like flanges integrally commuicating with a holed radial plate. Such multiple arrangements allow for increased braking surface and power, within the limits of a given road wheel interior space, and suited to application in vehicles having high axle loads. For additional safety, only one brake of each wheel may be operatively interconnected, thereby affording a vehicle with two or more totally independent braking systems. In other applications, such a common multiple brake assembly may be fitted to each vehicle wheel, with all the brakes on each forward wheel (where higher brake loads normally occur) hydraulically operative in the normal way, but with one, say the innermost, brake on each rear wheel acting as a parking brake. Bearing in mind that the outermost of the concentric bands have the largest surface area and potential power, such arrangement allows for distribution of brake loads in approximate proportion of front 60%, rear 40%, in many vehicles close to the desired optimum. If part of a multiple unit is used as a parking brake, it will need to withstand far smaller loads than the hydraulically actuated brakes, and so may be constructed of different, probably less strong and expensive materials. For example plastic material may be used in band construction, either as mounted on a tensile core or as an integral tensile band. If such material is itself too soft, or has not sufficient friction co-efficient a foreign material aggregate may be mixed with the plastic during manufacture, such aggregate including for example asbestos powder. If desired the proportion of aggregate present may vary through band thickness, with optionally a higher proportion found adjacent the braking surface, as shown in FIG. 14. Although described in relation to parking brakes, such alternative constructions may be used in any embodiment of the invention, including in suitably scaled up and strengthened form for commercial vehicle brakes. In the configuration of multiple brakes described by example in FIG. 13 only one of the brakes may be that of the present invention, the other brake(s) comprising loads actuated on the other flange(s) by either conventional drum brake shoe arrangements or by an alternative configuration of band assemblies.

Figure 15:
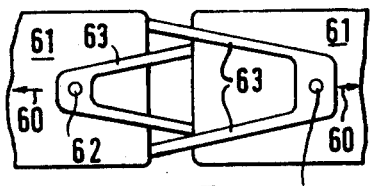
FIGS. 15–18 show alternative constructions of the intermeshing ends of the band elements.
Figure 17:
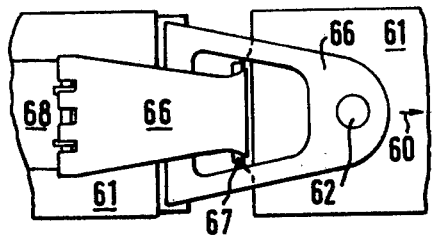
Figure 16:
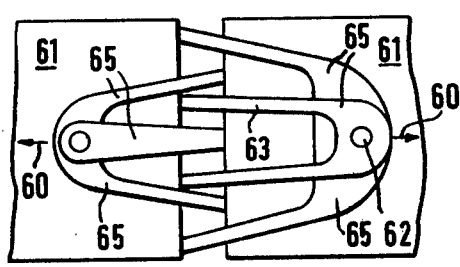
Figure 18:
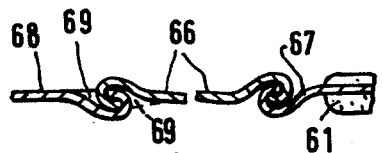

In alternative configurations, the ends of the bands may intermesh past each other in different ways, as shown by way of example in FIGS. 15 to 19, where in all cases 60 is direction of application force, 61 the friction band assembly, 62 provision for a pivot. In FIG. 15 the end parts of the band assembly consist of two intermeshing loops 63 of tensile material. Although here one loop is employed at each end of the band, any number of loops may be used, whether intermeshing in pairs or not. The loops may be of any convenient form, including of roughly triangular form as illustrated. In FIG. 16 is shown a loop 65 projecting from one end of the band assembly being intermeshed by a continuous element 64 projecting from the other end, each projection having provision for a pivot 62. From each end of the band project multiple separated loops or members 65 having coincident provision for pivots. Their separateness ensures that each set of projections can be properly intermeshed during fitment of the band, before attachment of band ends to pivot.

So far it has been shown that the band ends are integral with, and form projections of, the core of the band assembly. In an alternative configuration the integral tensile core, and optionally also the band ends, comprise a chain or series of chains, and this and any other configuration of core, any outward spring loading of band assembly may be provided by the composition of the friction material and/or method of manufacture of band assembly. In an alternative configuration a hinge or facility for bending may be provided in the tensile, load-carrying element of the band assembly near to the point where the band ends intermesh. As illustrated by way of example in FIG. 17, the hinge is formed by a curved lip on each band end member 66 hooking into a corresponding lip formed in a small portion of the tensile load carrier 67 projecting from the band assembly. In this embodiment the brake is applied at only one end in direction 60, the other end being fixed, for example, by fixing hinged end member 66 to anchorage 68. This hinging is shown in detail at B in FIG. 18, and is according to the same principles as at A, except that there is a succession of short lips interlocking, each lip being stiffened by a closing flange 69 at one end.

Figure 19:
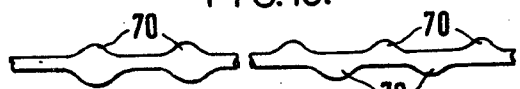
FIGS. 19–25 show alternative constructions of the tensile load carrier elements of the brake band assembly.
Figure 20:
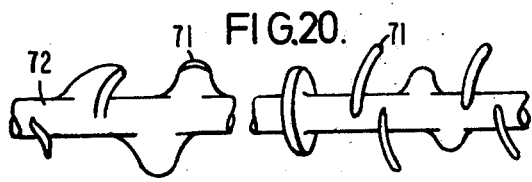
Figure 21:
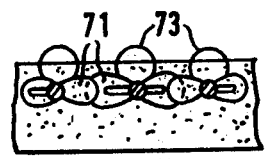
Figure 22:
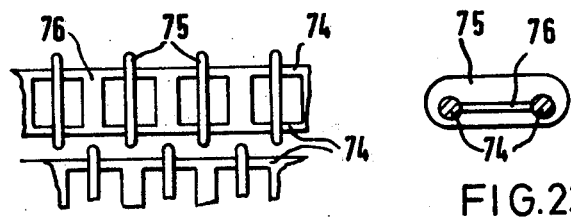
Figure 23:
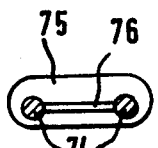
Figure 24:
Figure 25:

The tensile cores have been shown as regular wires. FIGS. 19 to 24 show alternative core configurations. In FIG. 19 is shown wire having a succession of projections of nodular configuration 70, while FIG. 20 shows a series of flange- or fin-like projections 71 from the core wire 72, such embodiments being located in the band assembly 61 as shown for example in cross-section in FIG. 21, wherein some of the flanges or fins protrude from the back of the band assembly as at 73. In order also to assist in cooling in the core and projections, the wire is of material having high heat conductivity. In another embodiment the core is of ladder-like configuration, as illustrated by example in plan in FIG. 22 and cross-section in FIG. 23, where each ladder consists of parallel wire cores 74 connected by alternate perpendicularly projecting flanges 75 and flat web-like members 76, the 'ladders' being here aligned with their projecting flanges staggered. Alternatively, the cores may consist of flat tensile strips, in a preferred embodiment having pinched or pressed deformations comprising projections as shown in plan, FIG. 24 and elevation, FIG. 25.

There have been mentioned in the basic embodiment certain guides, principally as a means for restraining the optionally spring loading actuated outward movement of the band. It is in fact a preferred embodiment of the invention to have the band assembly spring loaded or biased to open outwards, but in alternative embodiments the core, band ends or band assembly may also operate in compression to be pushed outwards by the spring or other loading actuated movement of the band application mechanism or linkage. In any case it is usual to have some force tending to cause the diameter of the band to increase during the non-application of the brake, and some form of stop or guide must be employed to resist this force, such stops and/or guides being optionally anywhere in the brake system including at the application mechanisms or linkages. In a preferred embodiment such stop and/or guides are disposed somewhere about the external circumference of the band, to restrict if desired both radial expansion and lateral movement of the band, as has been described in the basic embodiment. However guides which are disposed about the circumference of the band may fulfil at least two other important functions.

Figure 26:
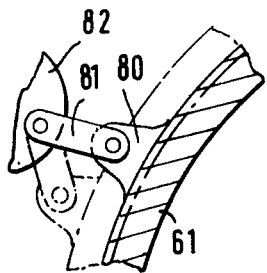
FIGS. 26–28 illustrate alternative arrangements of the band element guides.
Figure 27:
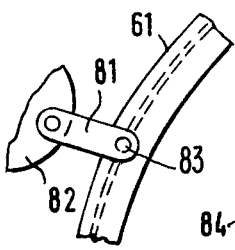
Figure 28:
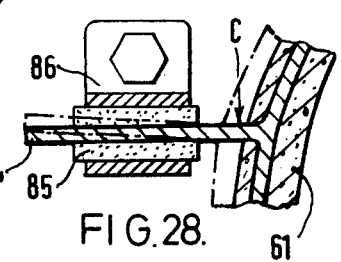

The first is to some degree resisting the tendency of the band to rotate on application of the brake. It is obvious from the diagrams that the guides will to some degree resist the tendency of the band to rotate. Most alternative brake bands have no such fixings and are supported at only one end, the other movable during brake application. It is known that the loads in a band are strongest near the portion being pulled and weakest furthest from this point of application, so the alternative band will have uneven load distribution. If a conventional brake band has both ends movable during application a similarly poor load distribution takes place, due to the tendency of the band to rotate, against the application force at one end and magnifying it at the other. The provision of the guides of the invention, which may be employed with any band brake, ensure that a substantial part of the rotational loads are taken from the band ends, enabling the forces of a double application movement to be more equally balanced. Any number of such guides may be disposed about the circumference of the band in any manner and construction, to allow the band to move in a desired path onto and from the drum. Alternative configurations of guides are shown by example in FIGS. 26 to 28, wherein 61 is a portion of the band assembly. FIG. 26 shows a projection 80 on the back of the band hingedly attached to a linkage 81, in turn hingedly or pivotably attached to an anchorage point 82. The position of part of the band when of expanded diameter is shown dotted. FIG. 27 shows a similar linkage 81 pivotably mounted on an anchorage point 82, the other end of the linkage being pivotally mounted at a point 83 aligning with the band thickness. FIG. 28 shows a fixed integral protrusion 84 from the core to be slidably mounted within a collar 85 of elastomeric material, the collar in turn mounted on or within a fixed anchorage point 86. In an alternative embodiment hinging means may be applied about point C.

Earlier there has been mentioned the on-off servo action of band brakes in general, which is caused by the rotational movement imparted by the drum to cause one end of the band to be pulled onto it, giving improved braking and at the other end causing the band to be pushed away, causing reduced braking, the variation of braking power accounting for uneven load distribution and wear. In fact the provision of guides as band restraining means will to some degree cause the on-off servo effect to vary about each fixing, creating within the band a number of waves (corresponding to number of guides) of greater and lesser braking effect, rather than an extreme progression of high load to low load throughout the band. This tendency will be present to a much lesser degree if guides are used, and the main band load pattern will be overlapped by the waved load pattern caused by the guides. Nevertheless, there will still be points in the band where a peak of 'on' servo effect is created and other points where a peak of 'off' servo effect is created, whether there is a succession of such points or just one at each end of the band. The guides may be so employed as to form a means of regulating this on-off servo effect, decreasing loads where servo is on and increasing it where servo is off, so causing the load distribution throughout the band to be more equal, giving improved braking performance, reliability and wear. It will be seen that the slidable closure movement allowable by the guides is in the embodiment of FIG. 1 roughly at an angle of 45° to direction of rotational movement. Assuming that in the principle embodiment of FIG. 1 the drum in normal operation rotates in an anti-clockwise direction, then in the portion towards the left-hand end of the band there will be an on servo action, whereas towards the right-hand end of the band an off servo action. Considering the forces about the left-hand guide, the rotational movement (which may be described, for the sake of simplicity, as cause of the on-off servo effect) will tend to push the band downwards and its protrusion downwards further into the guide. But the guide is angled and any downward movement into it will tend to cause the band to lift from the drum, so reducing the loads at that area. According to similar principles, the rotational movement in combination with angle of guide will cause the band to be pressed into the drum about the area of the right-hand guide, increasing braking loads there. In other words, in the embodiment of FIG. 1, the guides have had the effect of tending to reduce loads in an area of on servo action and increase them in an area of off servo action, thereby more evenly distributing the loads in the band. The degree to which the guides act as load compensators will depend on the angle of closure movements they allow, and this may be progressively varied about the circumference of the drum, e.g., being nearly perpendicular to rotational movement at one end (giving little load compensation) and at 55° to rotational movement at the other end (giving greater load compensation).

Figure 29:
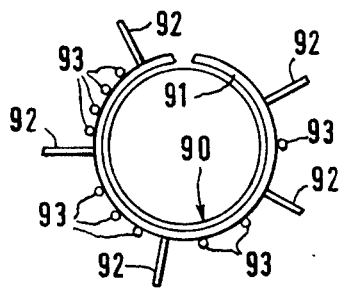
FIG. 29 is a diagrammatic view of one arrangement of band element guides disposed about a band assembly.

It has been shown that the guides can, by the variation of embodiment and the angle of movement allowable in any manner, be used to control and regulate the loadings and movement during applications of the band assemblies. Such guides may be used in any number and any combination, including of type and size, about a single band brake assembly, as illustrated diagrammatically by example in FIG. 29, wherein 90 is a revolving drum, 91 a band assembly and 92 guides serving principally to resist rotational movement and 93 guides serving principally to compensate for braking loadings.

Any suitable materials may be used in the invention, including those currently employed in the art of brake construction. Core materials may be of stainless or other steels, various metals, of synthetic materials of the polymer (giant molecule) family such as Nylon and Kevlar. The friction material may comprise any type or configuration of ceramic or polymer or mixture of these, and may additionally have metal additives. In preferred embodiments the friction material is substantially made of material having good conductivity, such as metals and some of the ceramic or ceramic based polymers. If the band is of integral construction a mixture of polymer and ceramic is preferred. In any embodiment of band assembly load bearing or reinforcing or thermally conductive wires or strands may be disposed, these being of any suitable material, including metal, carbon, ceramic such as alumina, boron on its compounds, etc.

The above embodiments have served to illustrate the principles of the invention by way of examples, and these principles and embodiments may be used in any convenient combination with each other.

Any of the features disclosed may be used in any embodiment and possible configuration with each other, and also in combination with known braking devices and features, to constitute the brake system of the invention.

What I claim is:

1. A band brake system comprising a rotatable brake drum having an annular flange, a flexible brake and circumferentially arranged about the annular flange of said drum, actuating means for contracting said brake band into frictional engagement with said annular flange and guide means arranged about the circumference of said brake band for urging, during contraction of said brake band about the rotating drum, a segment of said brake band radially toward said annular flange in one rotational direction of said brake drum and radially away from said annular flange in the other rotational direction of said brake drum to thereby more evenly distribute the radial frictional loads between said brake band and said annular flange.

2. A band brake system according to claim 1, wherein said brake band includes protrusions extending from the outer periphery thereof, said protrusions being inclined with respect to said outer periphery, said guide means including first and second guide members fixedly mounted with respect to said brake drum, each of said guide members having a slot therein inclined with respect to said brake band outer periphery for slidably receiving said protrusions.

3. A band brake system according to claim 2, wherein said protrusions comprise wire loops extending from said brake band and including stop means connected to said guide members for limiting axial movement of said brake band with respect to said annular flange.

4. A band brake system according to claim 2, wherein the inclination of the slot said first guide member and the inclination of the protrusion cooperating therewith are substantially the same and are arranged to urge a first segment of said brake band radially away from said annular flange in said one rotational direction of said brake drum, and the inclination of the slot in said second guide member and the inclination of the protrusion cooperating therewith are substantially the same and are arranged to urge a second segment of said brake band radially toward said annular flange in said one rotational direction of said brake drum.

5. A band brake system according to claim 4 wherein the inclination of said protrusions forms approximately a 45° angle with a plane tangential to the outer periphery of said brake band at the intersection of said protrusions with said brake band.

6. A band brake system according to claim 1, wherein said guide means further limits rotational movement of said brake band with respect to said brake drum.

7. A band brake system according to claim 1, wherein said guide means include first and second pivotable linkages, said pivotable linkages each comprising an anchorage fixedly mounted with respect to said brake drum, a rigid link pivotally mounted at one end to said anchorage and pivotally mounted at the other end to said brake band, the link of said first pivotable linkage being oriented with respect to said brake band and its anchorage such that, during contraction of said brake band about the rotating drum, the portion of said brake band connected to said first pivotable linkage is urged away from said annular flange, and the link of said second pivotable linkage being oriented with respect to said brake band and its anchorage such that, during contraction of said brake band about the rotating drum, the portion of said brake band connected to said second pivotable linkage is urged toward said annular flange.

8. A band brake system according to claim 1, wherein said brake band has inner and outer circumferential surfaces and including a resilient tensile member biasing said brake band into radially spaced relation to said annular flange, a friction element supported by said resilient tensile member and forming the inner circumferential surface of said brake band, said friction element extending through said tensile member and forming at least a portion of the outer circumferential surface of said brake band.

9. A band brake system according to claim 8, wherein said tensile member comprises a plurality of flexible cores extending lengthwise through at least a portion of said friction element.

10. A band brake system according to claim 9, wherein said cores are provided with a plurality of projections extending outwardly therefrom.

11. A band brake system according to claim 10, wherein at least some of said projections extend outwardly beyond the outer circumferential surface of said friction element.

12. A band brake system according to claim 8, wherein the ends of said tensile member are arranged in confronting relation on the periphery of said flange, each end of said tensile member having a curved lip, a band end member associated with each end of said tensile member, each band end member having a curved lip hingedly connected to the curved lip of its associated tensile member end.

13. A band brake system according to claim 8, wherein said tensile member comprises a flexible sheet having a plurality of openings therethrough, said friction element extending radially through said openings in said sheet.

14. A band brake system according to claim 8, including a plurality of heat conducting elements extending substantially through the thickness of said friction element from the inner to the outer circumferential surfaces of said brake band.

15. A band brake system according to claim 8, wherein the ends of said tensile member are provided with a plurality of band elements, the band elements of one end of said tensile member overlapping and intermeshing with the band elements of the other end of said tensile member.

* * * * *